(12) United States Patent
Malanga et al.

(10) Patent No.: US 10,815,331 B2
(45) Date of Patent: Oct. 27, 2020

(54) AUTOCATALYTIC POLYOLS

(71) Applicant: DOW GLOBAL TECHNOLOGIES LLC, Midland, MI (US)

(72) Inventors: Michael T. Malanga, Midland, MI (US); Sabrina Fregni, Nonantola (IT); George J. Frycek, Midland, MI (US); Stephen W. King, League City, TX (US); Jean-Paul Masy, Destelbergen (BE); Sadeka Onam, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 40 days.

(21) Appl. No.: 16/309,566

(22) PCT Filed: Jun. 7, 2017

(86) PCT No.: PCT/US2017/036264
§ 371 (c)(1),
(2) Date: Dec. 13, 2018

(87) PCT Pub. No.: WO2017/218254
PCT Pub. Date: Dec. 21, 2017

(65) Prior Publication Data
US 2019/0330405 A1    Oct. 31, 2019

(30) Foreign Application Priority Data

Jun. 13, 2016 (IT) .................. 102016000060467

(51) Int. Cl.
| | | |
|---|---|---|
| C08G 18/32 | (2006.01) | |
| C08G 18/48 | (2006.01) | |
| C08G 18/50 | (2006.01) | |
| C08G 18/63 | (2006.01) | |
| C08G 18/66 | (2006.01) | |
| C08G 18/76 | (2006.01) | |
| C08G 101/00 | (2006.01) | |

(52) U.S. Cl.
CPC ..... *C08G 18/3206* (2013.01); *C08G 18/3275* (2013.01); *C08G 18/482* (2013.01); *C08G 18/4816* (2013.01); *C08G 18/4841* (2013.01); *C08G 18/5021* (2013.01); *C08G 18/632* (2013.01); *C08G 18/6674* (2013.01); *C08G 18/6688* (2013.01); *C08G 18/7621* (2013.01); *C08G 18/7664* (2013.01); *C08G 2101/0008* (2013.01)

(58) Field of Classification Search
CPC ............ C08G 18/3206; C08G 18/3275; C08G 18/4816; C08G 18/782; C08G 18/4841; C08G 18/5021; C08G 18/632; C08G 18/6674; C08G 18/6688; C08G 18/7621; C08G 18/7664; C08G 2101/0008
See application file for complete search history.

(56) References Cited

U.S. PATENT DOCUMENTS

| | | |
|---|---|---|
| 2,846,408 A | 8/1958 | Brochhagen et al. |
| 3,201,400 A | 8/1965 | Bedoit, Jr. |
| 4,394,491 A | 7/1983 | Hoffman |
| 4,863,979 A | 9/1989 | Beyersdorf et al. |
| 4,883,825 A | 11/1989 | Westfall et al. |
| 4,963,399 A | 10/1990 | Gill |
| 5,010,187 A | 4/1991 | Heuvelsland |
| 5,070,125 A | 12/1991 | Heuvelsland |
| 5,114,619 A | 5/1992 | Heuvelsland |
| 5,194,453 A | 3/1993 | Jourquin et al. |
| 5,470,813 A | 11/1995 | Le-Khac |
| 5,476,969 A | 12/1995 | Hinz et al. |
| 5,589,431 A | 12/1996 | Le-Khac |
| 6,008,263 A | 12/1999 | Thompson et al. |
| 6,534,441 B1 | 3/2003 | Bartley et al. |
| 6,762,274 B2 | 7/2004 | Waddington et al. |
| 7,361,695 B2 | 4/2008 | Tu et al. |
| 8,187,997 B2 | 5/2012 | King et al. |
| 8,293,676 B2 | 10/2012 | King et al. |
| 8,367,870 B2 | 2/2013 | Burdeniuc et al. |
| 9,000,217 B2 | 4/2015 | King |
| 2007/0112086 A1 | 5/2007 | Matsumoto et al. |
| 2009/0227695 A1 | 9/2009 | Burdeniuc et al. |
| 2013/0231476 A1 | 9/2013 | King |
| 2014/0357750 A1* | 12/2014 | King .................... C07D 295/13 521/166 |

FOREIGN PATENT DOCUMENTS

| | | |
|---|---|---|
| WO | 2013/102053 A1 | 7/2013 |
| WO | 2016/204981 A1 | 12/2016 |

OTHER PUBLICATIONS

PCT/US2017/036264, International Search Report and Written Opinion dated Aug. 7, 2017.
PCT/US2017/036264, International Preliminary Report on Patentability dated Dec. 18, 2018.

* cited by examiner

*Primary Examiner* — Christopher M Rodd

(57) ABSTRACT

The present invention discloses a polymeric polyol composition useful for making polyurethane polymers, especially polyurethane foams. Said polyurethane polymer foams demonstrate a good balance of mechanical properties, physical properties, and low emissions. The polymeric polyol composition is the reaction product(s) of (i) a polyamine initiator composition comprising the polymerization product(s) of aminoethylpiperazine with (ii) at least one epoxide compound, at least one glycidyl ether compound, or mixtures thereof.

6 Claims, No Drawings

US 10,815,331 B2

AUTOCATALYTIC POLYOLS

FIELD OF THE INVENTION

The present invention pertains to novel tertiary amine compositions, initiators made therefrom, and polymeric polyol compositions made therefrom useful for making polyurethane polymers, especially polyurethane foams; said polyurethane polymer foams demonstrating a good balance of mechanical properties, physical properties, and low volatile organic compounds emissions.

BACKGROUND OF THE INVENTION

Polyether polyols based on the polymerization of alkylene oxides, and/or polyester polyols, are the major components of a polyurethane system together with isocyanates. Polyols can also be filled polyols, such as SAN (styrene/acrylonitrile), PIPA (polyisocyanate polyaddition) or PHD (polyurea) polyols. These systems generally contain additional components such as blowing agents, cross-linkers, chain extenders, surfactants, cell regulators, stabilizers, antioxidants, flame retardant additives, eventually fillers, and typically catalysts such as tertiary amines and/or organometallic salts.

Tertiary amine catalysts generally have a strong odor and many are highly volatile due to their low molecular weight. The release of the tertiary amine during foam processing may present safety and toxicity concerns and the release of residual amine during customer handling is undesirable. The release of tertiary amine catalysts vapor in polyurethane products is also reported to be detrimental to vinyl film and polycarbonate sheets exposed thereto. Fugitive amines are also associated with fogging issues, that is, deposit of solids or liquid film on an automotive wind-shield.

It is desirable to limit the volatility of this amine component or to lessen the amount of its use in a polyurethane formulation. In addition to reducing volatile organic compounds (VOC's), lessening volatility or reducing the level of amine use can reduce worker exposure, improve safety, and address quality concerns.

Compounds with tertiary amine groups are known to be useful catalysts for urethane reactions. Certain polyols, sometimes referred to as autocatalytic polyols, contain tertiary amine groups which can reduce or eliminate the need for typical tertiary amine catalysts in formulations for polyurethanes while still maintaining the reactivity of the urethane reaction system. Further, the presence of multiple tertiary amine groups in such a polyol compound allows it to be chemically bound during a polyurethane gel or foam crosslinking reaction, for example. The resultant product can be substantially free of volatile amine emissions. However, many such autocatalytic polyols if used alone do not provide an optimal blowing:gelling ratio such that polyurethane polymers made therefrom may demonstrate inadequate processing, physical properties and/or mechanical properties. For example, see US Publication No. 2009/0227695 which suggests addition of traditional fugitive type amine catalysts may improve properties. However, such an approach leads to increased emission products.

Thus, for urethane applications, especially polyurethane foam applications, there remains a need to be able to produce polymeric polyol compounds from compositions having multiple tertiary amine groups which provide a good blowing:gelling ratio which provide good polyurethane processing, physical properties and mechanical properties in a polyurethane polymer produced therefrom while reducing, or eliminating, both the amount of fugitive tertiary amine catalyst used and the volatile amine emissions.

SUMMARY OF THE INVENTION

Accordingly, the present invention is directed to such a polymeric polyol composition comprising the reaction products of (i) a polyamine initiator composition which is the reaction product(s) of the polymerization of aminoethylpiperazine (AEP) comprising one or more of the compounds represented by the structures:

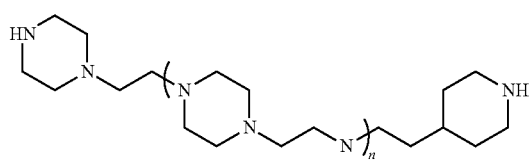

where n is from 1 to 10;

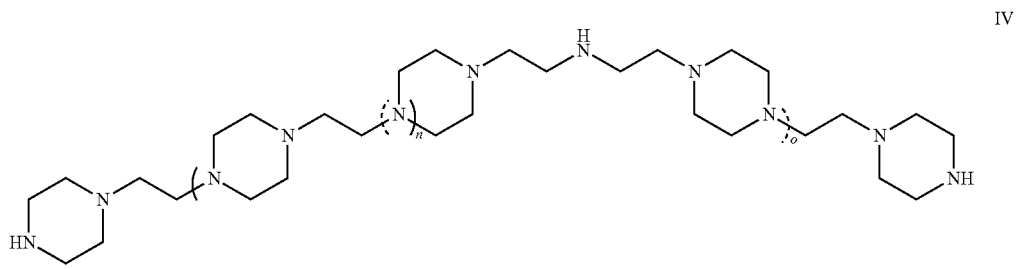

where n is from 0 to 10 and o is from 1 to 10 with the proviso that n+m is equal to or less than 10; and

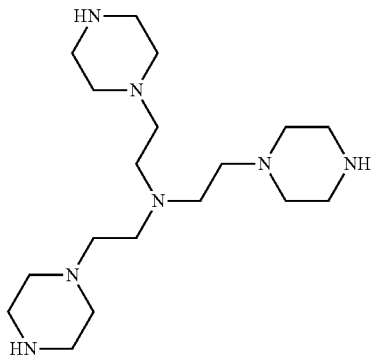

(ii) at least one epoxide compound having the structure VI:

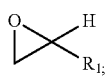

VI or at least one glycidyl ether compound having the structure VII:

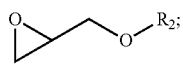

VII or a combination thereof; wherein $R^1$ is hydrogen, phenyl, cyclohexyl, or a $C_1$-$C_{18}$ linear or branched alkyl and $R^2$ is hydrogen, phenyl, a $C_1$ to $C_6$ linear or branched alkyl-substituted phenyl, or a $C_1$ to Cis linear or branched alkyl.

One embodiment of the present invention is a process to make a polyurethane polymer by reaction of a mixture comprising: (A) a polymeric polyol formulation comprising the polymeric polyol composition described herein above, (B) at least one organic isocyanate, (C) optionally a blowing agent, and (D) optionally additives or auxiliary agents known per se for the production of polyurethane polymers.

Another embodiment of the present invention is the process described herein above wherein the reaction occurs in the presence of a blowing agent and the polyurethane polymer is produced in the form of a polyurethane foam.

DETAILED DESCRIPTION OF THE INVENTION

The present invention discloses a novel polyamine initiator composition for the production of polyether polyols and polyurethane polymers made therefrom.

Generally, the polyamine initiator composition of the present invention is the reaction product(s) of polymerizing aminoethylpiperazine (AEP, I) as shown in the following schemes.

Scheme 1

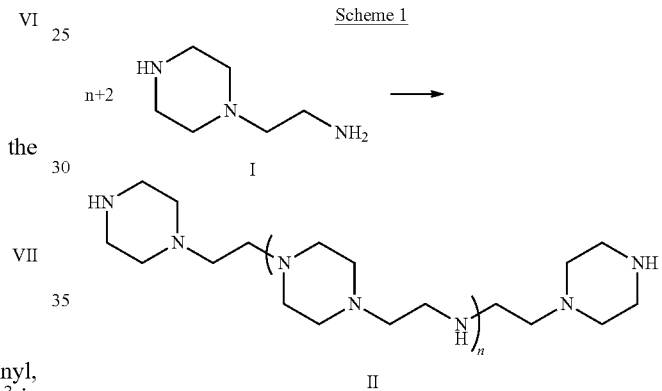

Another reaction product of the polymerization of AEP is a polymer comprising AEP and its dimmer, bis(2-(piperazine-1-yl)ethyl)amine (BPEA, IV) as shown in Scheme 2.

Scheme 2

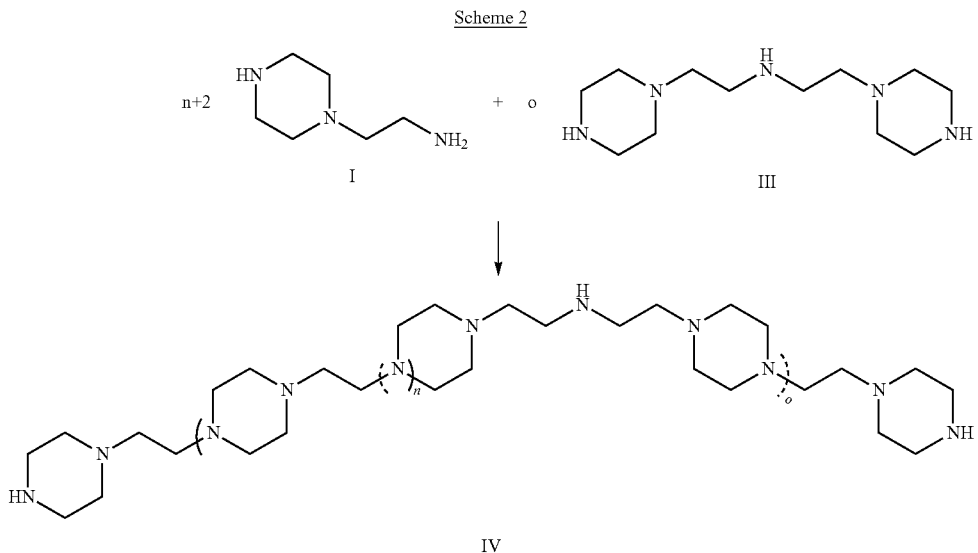

Another reaction product of polymerizing AEP is the trimer of AEP (V) as shown in Scheme 3.

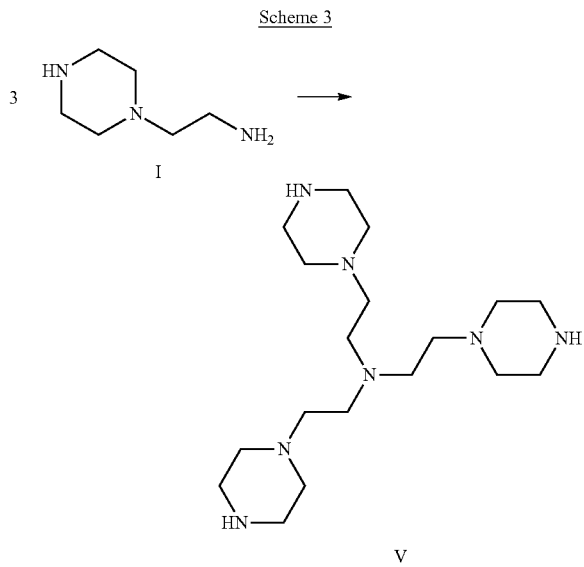

Scheme 3

Methods to make polyamines are known, for example see U.S. Pat. No. 9,000,217 and US Publication No. 2013/0231476, each is incorporated herein by reference in its entirety. The polyamine of the present invention is made by subjecting a diamine compound that has at least two non-tertiary amine groups that are separated from one another by a ternary or greater carbon spacing ($C_3$ or greater spacing) to a transamination reaction in the presence of a hydrogen/dehydrogenation catalyst to obtain a mixture of linear high molecular weight polyamine compounds having one or more nitrogen atoms (Scheme 1). To a minor extent, branched and/or cyclic high molecular weight polyamine compounds may be produced as well.

Transamination may be carried out in a variety of ways. In accordance with a preferred mode of practice, the reactants are combined and caused to react in a suitable reactor volume in the presence of a suitable catalyst under temperature and pressure conditions effective to cause the transamination reaction.

The methods of the invention can be practiced in any suitable reactor. These include batch reactors, continuous fixed bed reactors, slurry bed reactors, fluidized bed reactors, catalytic distillation reactors, combinations of these, and the like.

The catalyst material employed in the present invention comprises hydrogenation/dehydrogenation catalysts. Useful catalysts are those based upon nickel (such as Raney nickel and Urushibara nickel), rhenium, cobalt, copper, and mixtures thereof. Particularly useful catalysts comprise nickel/rhenium and nickel/cobalt. A most preferred catalyst comprises nickel (Ni) and rhenium (Re). In preferred embodiments in which a heterogeneous catalyst incorporates nickel and rhenium, useful supports are comprised of alumina-silica particles. Such catalysts and methods of making such heterogeneous catalysts on such supports are further described in U.S. Pat. Nos. 8,293,676; 8,187,997; and 6,534,441, each is incorporated herein by reference in its entirety.

The catalysts can be heterogeneous, homogeneous, or a combination of these may be used. Heterogeneous catalysts are preferred. Often, heterogeneous catalysts comprise one or more catalytic materials supported upon a suitable substrate. The substrate may be used in various shapes or combinations such as, for example, powder, particle, pellet, granule, extrudate, fiber, shell, honeycomb, plate, or the like. The particles can be regular in shape, irregular, dendritic, dendrite-free, or the like. Preferred supports are particulate in nature or powders. Suitable supports in the practice of the present invention include carbonaceous materials, silicaceous materials (such as silica), metal compounds such as metal oxides, combinations of these, and the like. Representative metal oxides include oxides of one or more of magnesium, aluminum, titanium, vanadium, chromium, manganese, iron, cobalt, nickel, copper, zinc, gallium, germanium, strontium, yttrium, zirconium, niobium, molybdenum, technetium, ruthenium, rhodium, palladium, silver, cadmium, indium, iron, tin, antimony, barium, lanthanum, hafnium, thallium, tungsten, rhenium, osmium, iridium, and platinum.

The amount of catalyst used in forming a high molecular weight polyamine using transamination is any amount which is effective in producing the desired acyclic polyamine For batch conditions, the quantity of catalyst may be in the range from about 0.1 to about 20 weight percent, preferably 1 to 15 weight percent, of catalyst per 100 parts by weight of reactant(s) to form the desired triamine. In a continuous process, a typical strategy might involve causing a flow of reactants to contact a bed of heterogeneous catalyst particles. In such a case, the space velocity (usually expressed in units of gmol/(kg catalyst/hr) can be adjusted to balance factors such as production and selectivity.

The reaction mixture for transamination can be contacted with catalyst at any suitable temperature(s) that produce the desired acyclic polyamine. Typically, the temperature is maintained below about 350° C., preferably below 300° C. Preferred temperatures are in the range from about 130° C. to about 200° C. for transamination. Below the preferred temperature ranges, the conversion to acyclic polyamine may be too slow to be practical for commercial scale production. Above the preferred temperature ranges, selectivity may be reduced to an undue degree, increasing the yield of by-products. In some instances, such by-products may have commercial value and be desirable as a consequence. In other instances, by-products constitute impurities as a practical matter.

Similarly, the reaction mixture for transamination can be contacted with catalyst at any suitable pressure(s) that promotes the reaction to produce the desired high molecular weight polyamine. Preferably, the pressure is sufficient to maintain the reactor contents in a liquid state as the reaction proceeds. In many instances, the pressure will vary as the reaction proceeds. For instance, ammonia is a by-product of a typical transamination process. The production of ammonia causes the pressure generally to increase as the reaction proceeds in pressure sealed reactors Ammonia and/or other pressure-increasing products can be removed from the reactor in order to keep the pressure below a desired threshold. Typically, the pressure is at least 200 psi, preferably at least 1000 psi, and preferably less than 1500 psi. Within these guidelines, the pressure is typically in the range from about 100 psi to 1500 psi, preferably 200 psi to 1500 psi, more preferably 300 psi to 1000 psi. For transamination, pressures in the range of 400 psi to about 1000 psi are preferred.

The polyamine compounds described herein above are suitable for use as a polyamine initiator composition of the present invention. Said polyamine initiator composition may be used to prepare polymeric polyol compositions comprising polyol compounds. The polyamine initiator composition may be used as produced to prepare a polymeric polyol composition, in other words, without any purification or isolation of specific reaction products and/or recovery of unreacted starting materials or side products. Alternatively, unreacted starting materials and/or undesired side products may be removed from the polyamine initiator composition, and/or specific reaction products may be isolated from the reaction product mixture. If specific reaction products are desired, they may be isolated and/or further purified, for example by distillation or extraction.

The polyamine initiator composition of the present invention preferably has an average weight average molecular weight (Mw) equal to or less than 5,000, preferably equal to or less than 2,500, more preferably equal to or less than 1,000, and even more preferably equal to or less than 500. The above initiator composition preferably has a Mw equal to or greater than 100, preferably equal to or greater than 200, and more preferably equal to or greater than 300. The Mw data in accordance with this disclosure can be determined by Gel Permeation Chromatography.

The above initiator composition preferably has an average hydroxyl number (reported as mg KOH/g) equal to or greater than 30, preferably equal to or greater than 40, more preferably equal to or greater than 50, and even more preferably equal to or greater than 60. The above initiator composition preferably has an average hydroxyl number equal to or less than 90, preferably equal to or less than 80, and more preferably equal to or less than 70. The hydroxyl number is measured by ASTM D4274 D.

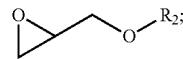

or a combination thereof;
wherein $R^1$ is hydrogen, phenyl, cyclohexyl, or a $C_1$-$C_{18}$ linear or branched alkyl
and
$R^2$ is hydrogen, phenyl, a $C_1$ to $C_6$ linear or branched alkyl-substituted phenyl, or a $C_1$ to $C_{18}$ linear or branched alkyl.

In structure VI, $R^1$ can be hydrogen, phenyl, cyclohexyl, or a $C_1$-$C_{18}$ linear or branched alkyl. In accordance with one aspect of the present invention, $R^1$ is methyl, ethyl, propyl, butyl, pentyl, hexyl, heptyl, 2-ethylhexyl, octyl, decyl, dodecyl, tetradecyl, hexadecyl, or octadecyl. In another aspect, $R^1$ can be hydrogen, phenyl, or cyclohexyl. In yet another aspect, $R^1$ is hydrogen, methyl, or phenyl. In this aspect, where $R^1$ is hydrogen, methyl, butyl, or phenyl, the epoxide compounds of structure VI are, respectively, ethylene oxide, propylene oxide, butylene oxide, or styrene oxide.

In structure VII, $R^2$ can be hydrogen, phenyl, a $C_1$ to $C_6$ linear or branched alkyl-substituted phenyl, or a $C_1$ to $C_{18}$ linear or branched alkyl. For instance, $R^2$ can be hydrogen, phenyl, or a $C_1$ to $C_6$ linear or branched alkyl-substituted phenyl, in one aspect of this invention. $R^2$ is methyl, ethyl, propyl, butyl, pentyl, hexyl, heptyl, 2-ethylhexyl, octyl, decyl, dodecyl, tetradecyl, hexadecyl, or octadecyl, in another aspect of this invention. Yet, $R^2$ can be phenyl or butyl-substituted phenyl in still another aspect of this invention.

In one embodiment, the polymeric polyol composition of the present invention comprises the reaction product of AEP (II) and ethylene oxide and/or propylene oxide:

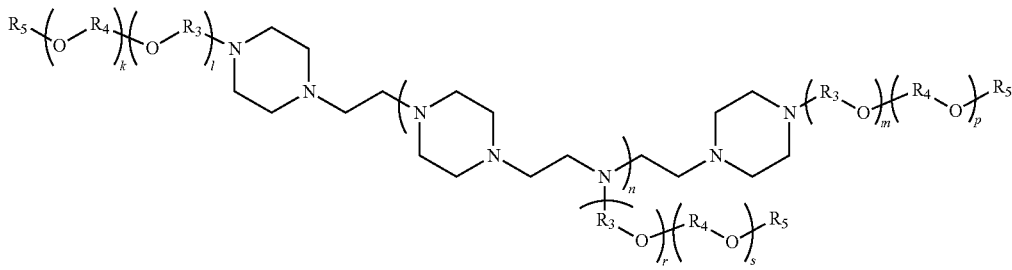

The polyamine initiator composition is useful to produce a novel polymeric polyol composition comprising polymeric polyol compounds. A first polymeric polymer composition is the reaction product(s) of an initiator composition (II) as described herein above with at least one epoxide compound having the structure VI:

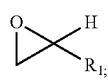

or
at least one glycidyl ether compound having the structure VII:

where $R_3$ is ethylene; $R_4$ is propylene; $R_5$ is H, ethyl, or propyl; n is 1 to 10 and k, l, m, p, r, and s are independently 0 to 100, preferably 15 to 100.

In the embodiment when both k and l are equal to or greater than 1, and/or both m and p are equal to or greater than 1, and/or both r and s are equal to or greater than 1 each copolymer structure comprising ethylene oxide and propylene oxide may be blocky or random.

The polymeric polyol composition of the present invention preferably has a Mw equal to or less than 10,000, preferably equal to or less than 8,000, and even more preferably equal to or less than 6,000. The above resulting polymeric polyol composition preferably have a Mw equal to or greater than 500, preferably equal to or greater than 2,500, and more preferably equal to or greater than 5,000.

According to one aspect of the present invention, the polymeric polyol composition disclosed herein above has a hydroxyl number of equal to or less than 90 mg KOH/g, preferably equal to or less than 80, more preferably equal to or less than 70, more preferably equal to or less than 60, and even more preferably equal to or less than 50 mg KOH/g. The resulting polymeric polyol composition disclosed herein above have a hydroxyl number equal to or greater than 20 mg KOH/g, preferably equal to or greater than 30, more preferably equal to or greater than 40 mg KOH/g. Hydroxyl number is determined according to ASTM D 4274.

In another aspect of the present invention, the herein above polymeric polyol composition has an average functionality (F) equal to or less than 12, preferably equal to or less than 10, more preferably equal to or less than 8, more preferably equal to or less than 6, and even more preferably equal to or less than 4. Preferably, the above polymeric polyol composition has an average functionality equal to or greater than 1, and more preferably equal to or greater than 3.

The polymeric polyol compositions of this invention also can be characterized by nitrogen content. For instance, amine values of polymeric polyol compositions disclosed herein above are equal to or less than 3 mg/g KOH/g, preferably equal to or less than 2, more preferably equal to or less than 1, more preferably equal to or less than 0.5 mg KOH/g. Nitrogen content is determined according to ASTM D 6979 and reported as percent Nitrogen.

Making polymeric polyol compositions is well known in the art; any suitable process to make polymeric polyol compositions from initiator II above is acceptable. For instance, initiator II can be mixed with a catalyst and this mixture is subsequently reacted with ethylene oxide or propylene oxide at a temperature in a range from about 100° C. to 160° C. A traditional catalyst used in this reaction, and known to those of skill in the art, is KOH. Other alkaline hydroxide or hydroxide hydrate catalysts based on Ba (barium) or Sr (strontium) can be employed as the alkoxylation catalyst; producing products with less unsaturation than those produced using the traditional KOH catalyst. Processes for producing polyols using Ba or Sr catalysts are described in U.S. Pat. Nos. 5,070,125; 5,010,187; and 5,114,619, the disclosures of which are incorporated by reference in their entirety. High levels of unsaturation, especially with polyols of high equivalent weight, act as chain terminators in polyurethane foam production, giving rise to, for example, foams with poor compressive strength, poor tensile strength, reduced reactivity, and reduced aging performance under humid conditions. The Ba and Sr catalysts also provide improved primary hydroxyl capping efficiency for the same weight percentage of ethylene oxide used. When using Ba or Sr catalysts, water can be added during the reaction of the ethylene oxide or propylene oxide with the initiator. This water addition can reduce the amount of unsaturation in the final polyol product. Another catalyst that can be used to produce polyols is a double metal cyanide (DMC) catalyst, which may provide a different molecular weight distribution of the polymeric polyol composition from that achieved using KOH. Examples of double metal cyanide catalysts are provided in U.S. Pat. Nos. 5,470,813; 5,589,431; and 6,008,263, the disclosures of which are incorporated herein by reference in their entirety.

We have found that a polymeric polyol composition comprising one or more polymeric polyol composition based on the polyamine initiator composition of the present invention is particularly useful for making polyurethane polymers, especially polyurethane foam polymers having good processing, good mechanical properties, good physical properties, and having low emission products. Further, we have found that a polymeric polyol formulation comprising one or more first polymeric polyol composition based on the polyamine initiator composition of the present invention and one or more additional polymeric polyol composition based on a second initiator, different from the first polyol composition based on the polyamine initiator composition of the present invention, is particularly useful for making polyurethane polymers, especially polyurethane foam polymers having good mechanical properties, good physical properties, and having low emission products.

In a polyol formulation, wherein more than one polymeric polyol composition is used, the weight ratio of the first polymeric polyol composition to the at least one second polyol can range from 50:1 to 1:5,000. In other aspects, the weight ratio of the first polymeric polyol composition to the at least one second polyol in the polyol formulation can range from 10:1 to 1:1,000, from 5:1 to 1:500, or from 4:1 to 1:250. Yet, in other aspect, the weight ratio of the first polymeric polyol composition to the at least one second polyol is in a range from 3:1 to 1:100, or from 2:1 to 1:50.

While compositions and methods are described in terms of "comprising" various components or steps, the compositions and methods can also "consist essentially of" or "consist of" the various components or steps.

Generally, polyurethane foam catalyst systems comprise compounds which accelerate both the blowing (water-isocyanate) and gelling (polyol-isocyanate) reactions. It is beneficial to balance these reactions in order to produce quality foams with acceptable properties. Compositions and formulations of the present invention can comprise a single compound which accelerates, but keeps in balance, both the blowing and gelling reactions.

Alternatively, the compositions can comprise at least one catalyst that predominantly accelerates the blowing reaction (a blowing catalyst), or at least one catalyst that predominantly accelerates the gelling reaction (a gelling catalyst), or a combination thereof. As described herein, a blowing catalyst is a catalyst that predominantly accelerates the blowing reaction, but can also, in certain circumstances, accelerate the gelling reaction, albeit to a lesser degree. Similarly, a gelling catalyst is a catalyst that predominantly accelerates the gelling reaction, but can also, in certain circumstances, accelerate the blowing reaction, albeit to a lesser degree. Surprisingly, we have found that a polymeric polyol formulation comprising one or more polymeric polyol composition based on the polyamine initiator composition of the present invention provides a good blowing:gelling ratio such that polyurethane polymers made form said mixture of polymeric polyols, especially polyurethane foam polymers, have very good mechanical properties and physical properties and demonstrate low levels of emission products.

The presence of multiple tertiary amine groups in the polymeric polyol compositions of the present invention can either reduce or eliminate the need to include a conventional fugitive urethane catalyst when formulating a polyurethane polymer or polyurethane polymer foam. However, in other aspects of the present invention, conventional urethane catalysts can be employed in compositions or formulations along with such polymeric polyol compositions.

In addition to the polymeric polyol compositions disclosed herein above, one or more additional polyol may be used in the polymeric polyol formulation for use in making a polyurethane polymer of the invention. As used herein the term polyols are those materials having at least one group containing an active hydrogen atom capable of undergoing reaction with an isocyanate. Preferred among such compounds are materials having at least two hydroxyls, primary or secondary, or at least two amines, primary or secondary, carboxylic acid, or thiol groups per molecule. Compounds having at least two hydroxyl groups or at least two amine groups per molecule are especially preferred due to their desirable reactivity with polyisocyanates.

Suitable polyols that may be used to produce polyurethane foams of the present invention are well known in the art and include those described herein and any other commercially available polyol and/or SAN, PIPA or PHD copolymer polyols. Such polyols are described in "Polyurethane Handbook", by G. Oertel, Hanser publishers. Mixtures of one or more polyols and/or one or more copolymer polyols may also be used to produce polyurethane products according to the present invention.

Representative polyols include polyether polyols, polyester polyols, polyhydroxy-terminated acetal resins, hydroxyl-terminated amines and polyamines. Natural oil based polyols can also be used. Examples of these and other suitable isocyanate-reactive materials are described more fully in U.S. Pat. No. 4,394,491. Alternative polyols that may be used include polyalkylene carbonate-based polyols and polyphosphate-based polyols. Preferred are polyols prepared by adding an alkylene oxide, such as ethylene oxide, propylene oxide, butylene oxide or a combination thereof, to an initiator or blend of initiators to give a final polyol a nominal functionality having from 2 to 8, preferably 2 to 6 active more preferably 2.1 to 4 active hydrogen atoms. Catalysis for this polymerization can be either anionic or cationic, with catalysts such as KOH, CsOH, boron trifluoride, or a double metal cyanide complex (DMC) catalyst such as zinc hexacyanocobaltate, or quaternary phosphazenium compounds. In the case of alkaline catalysts, these are eliminated from the polyol at the end of production by a proper finishing step, such as coalescence, magnesium silicate (magsil) separation, ion exchange or less preferably by acid neutralization. In the case of DMC catalyst produced polyols, the finishing step can be avoided.

The polyols or blends thereof employed depend upon the end use of the polyurethane foam to be produced. The hydroxyl number and molecular weight of the polyol or polyols employed can vary accordingly over a wide range. In general, the hydroxyl number of the polyols employed for use in producing a flexible or visco-elastic foam may range from 15 to 300.

In the production of a flexible polyurethane foam, the polyol is preferably a polyether polyol and/or a polyester polyol or a polyetherester polyol. The polyol generally has an average functionality ranging from 2 to 5, preferably 2 to 4, and an average hydroxyl number ranging from 15 to 300 mg KOH/g, preferably from 20 to 200, and more preferably from 20 to 70 mg KOH/g. As a further refinement, the specific foam application will likewise influence the choice of base polyol. As an example, for molded foam, the hydroxyl number of the base polyol may be on the order of 20 to 60 with ethylene oxide (EO) capping, and for slabstock foams the hydroxyl number may be on the order of 25 to 75 and is either mixed feed EO/PO (propylene oxide) or is only slightly capped with EO or is 100 percent PO based.

In the production of a visco-elastic foam, polyols having a functionality as for flexible foam can be used, however; the polyol or polyol blend will preferably contain polyols having a hydroxyl number from 150 to 300 mg KOH/g. For the production of semi-rigid foams or microcellular elastomers, it is preferred to use a trifunctional polyol with a hydroxyl number of 30 to 80.

The isocyanates which may be used in the present invention include aliphatic, cycloaliphatic, arylaliphatic and aromatic isocyanates. For the production of slabstock foam, aromatic isocyanates are preferred.

Examples of suitable aromatic isocyanates include the 4,4'-, 2,4' and 2,2'-isomers of diphenylmethane diisocyante (MDI), blends thereof and polymeric and monomeric MDI blends toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimehtyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine TDI/MDI blends may also be used. MDI or TDI based prepolymers can also be used, made either with a polymeric polyol composition comprising initiator (I) and/or, a polymeric polyol composition comprising initiator (XII) or any other polyol as described heretofore. Isocyanate-terminated prepolymers are prepared by reacting an excess of polyisocyanate with polyols, including aminated polyols or imines/enamines thereof, or polyamines Examples of aliphatic polyisocyanates include ethylene diisocyanate, 1,6-hexamethylene diisocyanate (HDI), isophorone diisocyanate (IPDI), cyclohexane 1,4-diisocyanate, 4,4'-dicyclohexylmethane diisocyanate ($H_{12}MDI$), saturated analogues of the above mentioned aromatic isocyanates and mixtures thereof.

For the production of flexible foams, the preferred polyisocyanates are the toluene-2,4- and 2,6-diisocyanates or MDI or combinations of TDI/MDI or prepolymers made therefrom.

For producing a polyurethane-based foam, a blowing agent is generally required. In the production of flexible polyurethane foams, water is preferred as the blowing agent. The amount of water is preferably in the range of from 0.5 to 10 parts by weight, more preferably from 2 to 7 parts by weight based on 100 parts by weight of the polyol and even more preferably the water is between 2 and 5 parts per hundred parts polyol. In some applications the water is preferably present in 3 parts by weight of the polyol. In some preferred embodiment, the water is present at of 6 parts or less by weight of the polyol. When water is present at less than 3 parts, a small conventional amine catalyst can be used to enhance the reactivity of the system. The amount of conventional amine catalyst included in such formulations is generally from 0.01 to 0.1 weight percent of the polyol. To further reduce the level of volatile amine, such a catalyst is used as less than 0.05 weight percent of the polyol. Although not preferred, other blowing agents can be liquid or gaseous carbon dioxide, methylene chloride, acetone, pentane, isopentane, cyclopentane, methylal or dimethoxymethane, dimethylcarbonate. Use of artificially reduced, or increased, atmospheric pressure, such as disclosed in U.S. Pat. No. 5,194,453, or frothing, can also be contemplated with the present invention.

In addition to the foregoing critical components, it is often desirable to employ certain other ingredients in preparing polyurethane polymers. Among these additional ingredients are catalysts, surfactants, preservatives, flame retardants, colorants, antioxidants, reinforcing agents, stabilizers and fillers, recycled polyurethane powder.

One or more catalysts for the reaction of the polyol with the polyisocyanate can be used. Any suitable urethane catalyst may be used, including tertiary amine compounds, amines with isocyanate reactive groups and organometallic compounds. Preferably the reaction is carried out in the absence of an amine or an organometallic catalyst or a reduced amount as described above. Exemplary tertiary amine catalysts include triethylenediamine; N-methylmorpholine; N,N-dimethylcyclohexylamine; pentamethyldiethylenetriamine; tetramethylethylenediamine; bis (dimethylaminoethyl)ether; N-ethylmorpholine; dimethylethanolamine; N-cocomorpholine; 1-methyl-4-dimethylaminoethyl-piperazine; 3-methoxy-N-dimethylpropylamine; N,N-dimethyl-N,N'-dimethyl isopropylpropylenediamine; N,N-diethyl-3-diethylamino-propylamine and dimethylbenzylamine Exemplary organometallic catalysts include organomercury, organolead, organoferric and organotin catalysts, with organotin catalysts being preferred among these. Suitable tin catalysts include stannous chloride, tin salts of carboxylic acids such as dibutyltin dilaurate, and stannous octoate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. The amount of amine catalysts can vary from 0.02 to 5 percent in the formulation or organometallic catalysts from 0.001 to 1 percent in the formulation can be used.

In one preferred embodiment of the present invention, the foams are produced with a catalyst package that includes a tin catalyst. Preferably such formulations do not contain a conventional amine catalyst.

In making polyurethane foam, it is generally preferred to employ an amount of a surfactant to stabilize the foaming reaction mixture until it cures. Such surfactants advantageously comprise a liquid or solid organosilicone surfactant. Other surfactants include polyethylene glycol ethers of long-chain alcohols, tertiary amine or alkanolamine salts of long-chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, 0.2 to 3 parts of the surfactant per 100 parts by weight total polyol (b) are sufficient for this purpose.

A crosslinking agent or a chain extender may be added, if necessary. The crosslinking agent or the chain extender includes low-molecular weight polyhydric alcohols such as ethylene glycol, diethylene glycol, 1,4-butanediol, and glycerin; low-molecular weight amine polyol such as diethanolamine and triethanolamine; polyamines such as ethylenediamine, xlylenediamine, and methylene-bis(o-chloroaniline). The use of such crosslinking agents or chain extenders is known in the art as disclosed in U.S. Pat. Nos. 4,863,979, 4,883,825 and 4,963,399 and EP 549,120.

When preparing foams for use in transportation, a flame retardant is sometimes included as an additive. Any known liquid or solid flame retardant can be used with the autocatalytic polyols of the present invention. Generally such flame retardant agents are halogen-substituted phosphates and inorganic flame proofing agents. Common halogen-substituted phosphates are tricresyl phosphate, tris(1,3-dichloropropyl phosphate, tris(2,3-dibromopropyl) phosphate and tetrakis (2-chloroethyl)ethylene diphosphate. Inorganic flame retardants include red phosphorous, aluminum oxide hydrate, antimony trioxide, ammonium sulfate, expandable graphite, urea or melamine cyanurate or mixtures of at least two flame retardants. In general, when present, flame retardants are added at a level of from 5 to 50 parts by weight, preferable from 5 to 25 parts by weight of the flame retardant per 100 parts per weight of the total polyol present.

The particular polyol, polyol mixture, and polyol amount used in the polyurethane foam forming composition can be chosen based on the factors such as the desired polyurethane foam properties and/or the particular end use of the foam product. Properties of the polyol such as molecular weight or hydroxyl number can be chosen to provide foam characteristics selected from: low density, high density foam, conventional, high resilient, hot molding, cold molding, flexible, and rigid, and desired combinations thereof. For many applications or foam properties, the hydroxyl number of the polyol is in the range of about 15 to about 800.

Compositions for the production of flexible polyurethane foams typically include a polyether polyol and/or a polyester polyol. The polyol generally has an average functionality ranging from 2 to 5, preferably 2 to 4, and an average hydroxyl number ranging from 20 to 100 mg KOH/g, preferably from 20 to 75 mgKOH/g (see, for example, U.S. Pat. No. 7,361,695 which is incorporated herein by reference in its entirety).

For molded foam, the hydroxyl number of the base polyol can be in the range of about 20 to about 60 with ethylene oxide (EO) capping, and for slabstock foams the hydroxyl number can be in the range of about 25 to about 75 (see, for example, U.S. Pat. No. 7,361,695 which is incorporated herein by reference in its entirety).

Processes for producing polyurethane foam products are well known in the art. In general components of the polyurethane-forming reaction mixture can be mixed together in any convenient manner, for example by using any of the mixing equipment described in the prior art such as in Polyurethane Handbook, by G. Oertel, Hanser publisher.

The polyurethane products can be produced continuously or discontinuously, by injection, pouring, spraying, casting, calendering, etc. Foams can be made under free rise or molded conditions, at atmospheric pressure, reduced or increased air pressure, with or without release agents, in-mold coating, or with any inserts or skin put in the mold. Flexible molded foams can be mono- or dual-hardness.

For example, a polyurethane polymer of the present invention may be made by the reaction of a mixture comprising: a polymeric polyol formulation comprising: a polymeric polyol composition comprising initiator II; at least one organic isocyanate; optionally a blowing agent; and optionally additives or auxiliary agents known per se for the production of polyurethane polymers for example, catalysts, surfactants, preservatives, flame retardants, colorants, antioxidants, reinforcing agents, stabilizers, fillers, and recycled polyurethane powder.

Slabstock foam is conveniently prepared by mixing the foam ingredients and dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and dispensed onto a conveyor that is lined with paper or plastic. Foaming and curing occurs on the conveyor to form a foam bun. The resulting foams are typically from about from 10 kg/m$^3$ to a maximum of 80 kg/m$^3$. A preferred range is from 10 kg/m$^3$ to 70 kg/m$^3$ and more preferably from 10 kg/m$^3$ to 60 kg/m$^3$ in density. In an even more preferred embodiment the slabstock foam has a density of 40 kg/m$^3$ or less.

A preferred slabstock foam formulation contains from 3 to 6, preferably 4 to 5 parts by weight water are used per 100 parts by weight high equivalent weight polyol at atmospheric pressure. At reduced or increased pressure these levels are adjusted accordingly to obtain targeted densities, i.e., reduced pressure will generally decrease the density.

Polyurethane foams produced using polymeric polyol compositions of the invention can be used in applications known in the industry. For example, flexible, semi-flexible foams and find use in applications such as vehicle applications such as seats, sun visors, armrests, door panels, noise and heat insulation parts, dashboards, or instrument panels. Exemplary placement of the foams includes locations such as under the carpet or in other parts of the car interior or in the engine compartment. Foam of the invention can also be used in many domestic applications such as shoe soles, cloth interliners, appliance, furniture, and bedding.

The polyurethane foams of the present invention may optionally be characterized by one or more foam properties, including, but not limited to density, indentation force deflection (IFD), sag factor, recovery ratio, guide factor, compression load deflection (CLD), percent compression set, tensile strength, elongation, aging tests, and tear strength.

Density is weight per unit volume (weight/volume) and typically expressed as lbs/ft3 (pcf) or g/L. Exemplary densities are in the range of about 20 g/L to about 80 g/L, or more specifically in the range of about 25 g/L to about 32 g/L.

Compression force deflection (CFD), such as measured by the ISO 3386/1 standard, is a testing standard designed to measure the compression stress/strain (load divided by specimen surface area at a certain compression percentage) characteristic of foam. CFD is also a measure of firmness and is expressed in pounds per square inch (psi), at a given percentage deflection. Exemplary densities are in the range of about 20 g/L to about 80 g/L, or more specifically in the range of about 25 g/L to about 32 g/L.

Percent compression set (CS), such as measured by the ISO 1856 standard, is a measure of the permanent deformation of a foam after it has been compressed between two metal plates for a controlled time period and temperature condition. The standard conditions are 22 hours at 70° C. (158° F.). Exemplary compression set values are in the range of about 1 to about 20, or more specifically in the range of about 5 to about 7.

Tensile properties is a measure according to ISO 1798 and tensile strength is the amount of force required to break an area of foam as it is pulled apart, and is generally expressed in pounds per square inch (psi). Foam compositions can be prepared to provide foam with a desired tensile strength, or a tensile strength within a desired range.

Elongation, such as measured by the ISO 1798 standard, is a measure of the extent to which the foam can be stretched before it breaks and is expressed as a percentage of its original length. Elongation is measured at the same time, as tensile strength is determined; therefore, the sample size is the same. Exemplary elongation values are in the range of about 50 to about 200, or more specifically in the range of about 110 to about 130.

Tear strength, such as measured by the ASTM D3574 standard, is a measure of the force required to continue a tear in foam after a split has been started and is expressed in pounds per linear inch (pli). Exemplary tear strengths are in the range of about 50 to about 350, or more specifically in the range of about 195 to about 230.

Emissions Measurements are done following VDA 278 (Thermal Desorption Analysis of Organic Emissions for the Characterization of Non-Metallic Materials for Automobiles) official protocol: —VOC value: volatile organic compounds (90° C., 30 min); Emission limits depend on car manufacturer, e.g., Daimler VOC≤100 µg/g following VDA 278 testing protocol.

The following examples are given to illustrate the invention and should not be interpreted as limiting in anyway. Unless stated otherwise, all parts and percentages are given by weight.

EXAMPLES

Preparation of Oligomeric Aminoethylpiperazine (AEP).

The reaction to make AEP oligomers is run in a 1 inch continuous packed bed reactor. The length of the reactor tube is 10 feet with approximately 8 feet filled with solid catalyst. The reactor is incased in 1.5 inch diameter Swagelok tubing through which heat transfer fluid is pumped via a standard laboratory heating bath. This allows for nearly isothermal operation of the reaction. There is a multipoint thermocouple inside the reactor bed for temperature monitoring of the reactor tube. Temperature and pressure is monitored at various points in the reactor system. The AEP feed material is pumped via a two 500 ml syringe pumps through a flow meter and into the bottom of the reactor, the pumps alternates fill and empty cycles to ensure continuous uninterrupted flow. The hydrogen gas is introduced to the AEP stream at the reactor bottom. The reaction operating temperature ranged from 140° C. to 180° C. and the operating pressure ranged from 250 to 800 psig. At the reactor outlet, the pressure is let down to 50 to 150 psig using back pressure regulators and the product is sent to an intermediate tank. There is a sampling system that allows for a timed sample to be taken of the product stream. The sample time is dependent on the feed flow rate, but routinely samples are taken in the range of 15 to 30 minutes to allow for collection of 40 to 60 g of liquid reaction product. The sampling system consists of a stainless reservoir to collect the AEP reaction mixture, followed by a small scrubber, and a wet test meter. This allows for quantification of the feed flow, ammonia generation, and hydrogen flow during sampling.

The crude product from the continuous reactor had BPEA selectivity (weight/weight) of 60 to 88% at an AEP conversion of 39 to 75% (weight basis). This crude reaction product is further refined using a 5 foot distillation column to strip 44 kg of 98% BPEA leaving 11 kg of heavier AEP oligomers or "heavies" (70 to 95% heavies) and 2 kg of lights-removed BPEA (87 to 92% BPEA). The product mixture is analyzed by both the gas chromatography and liquid chromatography-mass spectrometry method for the quantification and identification of products and by-products made by the reaction. This product mixture is used for Examples 1 and 2 to produce polymeric polyol compositions.

Preparation of Polymeric Polyols.

Example 1

In a 5 liter stainless steel reactor, 282 g of the crude reaction product of AEP oligomers is heated at 140° C. and 204 g propylene oxide are added within 30 minutes. The reactor is left 4 hours for reaction. 29 g of KOH solution in water at 45% are fed and a stripping of the water is realized during 1h30. At 120° C., 2388 g propylene oxide are gradually fed, before 1215 g ethylene oxide. The final product has an OH value 48.2 mgKOH/g, a viscosity of 1110 cSt at 25° C. and a basicity of 1.31 meq/g.

Example 2

In a 5 liter stainless steel reactor, 34 g of AEP oligomers mixed with bis(2-(piperazine-1-yl)ethyl)amine (BPEA) 244 g is heated at 140° C. and 200 g propylene oxide are added within 30 minutes. The reactor is left 4 hours for reaction. 29 g of KOH solution in water at 45% are fed and a stripping of the water is realized during 2 h. At 120° C., 2810 g propylene oxide are gradually fed, before 1215 g ethylene oxide. The final product has an OH value 46.1 mgKOH/g, a viscosity of 988 cSt at 25° C. and a basicity of 1.29 meq/g.

The polymeric polyol compositions of Example 1 and 2 are characterized in Table 1.

TABLE 1

|  | Example 1 | Example 2 |
| --- | --- | --- |
| Initiator Functionality | 3.5 | 3 |
| OH value, mg KOH/g | 48.2 | 46.1 |
| Calculated MW | 3492 | 3651 |
| Water, wt % | 0.027 | 0.027 |
| Total unsaturation, meq/g | 0.0508 | 0.0448 |
| Viscosity at 25° C., cSt | 1110 | 988 |
| pH, 1H$_2$O + 10MeOH | 11.4 | 11.6 |
| Basicity total, meq/g | 1.31 | 1.29 |
| Calculated amine/polyol | 4.6 | 4.7 |
| Amine value, mgKOH/g | 73 | 72 |

Preparation of Polyurethane Foams.

Polyurethane foams are processed by dispensing the polyurethane reactive mixture by hand-mixing (Herrington & et. al., 1997). Fully formulated polyol and isocyanate components are conditioned separately at 25° C. temperature for 30 min before foaming tests. The two components are mixed together in a metal cup at the required ratio reported in Table 2 and Table 3 using a mechanical overhead stirrer with a propeller blade at 1200 rpm speed for 12 sec.

The compositions for Examples 3 to 8 using TDI are given in Table 2, components are in parts per hundred (pph) unless otherwise noted. The liquid mixture is then immediately poured into a 0.5 liter paper cup, reactivity and growing profile has been measured by cream, gelling, and rise time and are reported in Table 2.

The compositions for Examples 9 to 14 using MDI are given in Table 3, components are in parts per hundred (pph) unless otherwise noted. The liquid mixture is then immediately poured into a 0.5 liter paper cup, reactivity and growing profile has been measured by cream, gelling, and rise time and are reported in Table 3.

In Tables 2 and 3:

"NC 632" is a 1,700 equivalent eight polyoxypropylene polyoxyethylene polyol initiated with a blend of glycerol and sorbitol available as SPECFLEX™ NC 632 from The Dow Chemical Company;

"NC 700" is a 49% solids content, having an OH number of 20 mg/g, copolymer polyol (CPP) for TDI and MDI formulations available as SPECFLEX™ NC 700 from The Dow Chemical Company;

"SA 2306" is an active polyol additive for use in preparing polyurethane foams without the use of additional catalysts available as SPECFLEX Activ 2306 from The Dow Chemical Company;

"CP 1421" is a 1675 equivalent weight, trifunctional PO/EO polyol for cell opening available as VORANOL™ CP 1421 from The Dow Chemical Company;

"NC 138" is a 2040 equivalent weight, 15% EO capped trifunctional PO/EO polyol available as VORANOL NC 138 from The Dow Chemical Company;

"B 8736" is TEGOSTAB B 8736 LF2 Surfactant for foam stability available from Evonik;

"B 8715" is TEGOSTAB B 8715 LF2 Surfactant for foam stability available from Evonik;

"Glycerin" is available from Aldrich Chemical;

"DEOA" is diethanol amine, available from Aldrich Chemical;

"TDI T80" is an 80:20 TDI mixture of 2,4 to 2,6 isomers available as VORANATE™ T-80 from The Dow Chemical Company;

"NE396" is a 30% NCO content MDI based isocyanate formulation available as SPECFLEX NE 396 from The Dow Chemical Company;

"Force to crush" and "Green hardness" are both measured using compressive equipment having a rectangular shapes with an internal capacity of 5 liters (300 mm×350 mm×75 mm). The following foaming procedure is followed:

1. Apply a release agent inside the square mold homogeneously
2. Put an empty cup on the balance and reset to zero
3. Weight the exact amount of Polyol Component into the cup.
4. Reset the balance to zero and then weight, quickly and precisely, the amount of isocyanate.
5. Take the cup away from the balance; allocate it into the seat of an automated mixer.
6. Once mixed, pour the material into the mold having rectangular shapes with an internal capacity of 5 liters Ensure the remaining material is in line with range indicated in standard procedure.
7. Lower the lid of the mold.

At the end of the cycle (3-4 minutes), the foam is taken out from the mold having a rectangular shape with an internal capacity of 5 liters paying attention to not crush the foam. Within 30 seconds from de-molding time, the Force to Crush is measured using a dynamometer plate instrument (INSTRON 4464). The "Peak value" given by the instrument is taken as the "Force to Crush" value.

Then, the foams are completely crushed using a crusher roller and the Green Hardness is checked immediately using the dynamometer plate compressing the foams at 50 of their original thickness, and the value measured 30 seconds after the target thickness is reached is the "Green Hardness" value.

Measurements are repeated three or four times at each Index to be statistically significant. Anova Analysis (analysis of variance) at low Isocyanate index (75:100, CE1 and E1) and at high isocyanate Index (95:100, CE3 and E3) are performed.

TABLE 2

| Example | 3 | 4 | 5 | 6 | 7 | 8 |
| --- | --- | --- | --- | --- | --- | --- |
| COMPOSITION | | | | | | |
| NC 632 |  | 28.05 | 24.05 | 20.05 | 28.05 | 24.05 | 20.05 |
| NC 700 |  | 55 | 55 | 55 | 55 | 55 | 55 |
| SA 2306 | | | | | | | |

TABLE 2-continued

| Example | 3 | 4 | 5 | 6 | 7 | 8 |
|---|---|---|---|---|---|---|
| Example 1 | 12 | 16 | 20 | | | |
| Example 2 | | | | 12 | 16 | 20 |
| B 8736 | 0.6 | 0.6 | 0.6 | 0.6 | 0.6 | 0.6 |
| Glycerine | 0.5 | 0.5 | 0.5 | 0.5 | 0.5 | 0.5 |
| DEOA | 0.6 | 0.6 | 0.6 | 0.6 | 0.6 | 0.6 |
| Water | 3.25 | 3.25 | 3.25 | 3.25 | 3.25 | 3.25 |
| TDI T80 | 95 | 95 | 95 | 95 | 95 | 95 |
| PROPERTIES | | | | | | |
| Cream time, sec | 14 | 12 | 12 | 13 | 12 | 12 |
| Gel time, sec | 125 | 109 | 92 | 129 | 100 | 97 |
| End rising, sec | 153 | 147 | 141 | 160 | 149 | 132 |
| Force to crush, daN | 21.8 | 40.3 | 54.6 | 25.4 | 39.4 | 42.4 |
| Green hardness, daN | 13.8 | 27.4 | 23.2 | 16.3 | 19.7 | 18 |

TABLE 3

| Example | 9 | 10 | 11 | 12 | 13 | 14 |
|---|---|---|---|---|---|---|
| COMPOSITION | | | | | | |
| CP 1421 | 1.5 | 1.5 | 1.5 | 1.5 | 1.5 | 1.5 |
| NC632 | 18.2 | 14.2 | 10.2 | 18.2 | 14.2 | 10.2 |
| NC 138 | 64.2 | 64.2 | 64.2 | 64.2 | 64.2 | 64.2 |
| SA 2306 | | | | | | |
| Example 1 | 12 | 16 | 20 | | | |
| Example 2 | | | | 12 | 16 | 20 |
| Water | 3.3 | 3.3 | 3.3 | 3.3 | 3.3 | 3.3 |
| DEOA | 0.35 | 0.35 | 0.35 | 0.35 | 0.35 | 0.35 |
| B 8715 | 0.45 | 0.45 | 0.45 | 0.45 | 0.45 | 0.45 |
| NE396 | 83.725 | 83.725 | 83.725 | 83.725 | 83.725 | 83.725 |
| PROPERTIES | | | | | | |
| Cream time, sec | 29 | 23 | 21 | 25 | 23 | 22 |
| Gel time, sec | 165 | 135 | 120 | 155 | 123 | 115 |
| End rising, sec | 183 | 160 | 117 | 174 | 161 | 120 |
| Force to crush, daN | 20.9 | 36.9 | 47.3 | 25.1 | 36.5 | 45 |
| Green hardness, daN | 16.5 | 29.6 | 37.3 | 19.5 | 28.9 | 36.5 |

All foams have nondetectable levels of amine as analyzed by Volatile Emissions VOC and FOG Testing per VDA 278 Testing Standard. The VDA-278 (Verband der Automobilindustrie (VDA 278), 2011) guidelines are as follows:

General VDA-278 Guidelines.

All analyses are performed according to the standard method VDA-278 'Thermal Desorption Analysis of Organic Emissions for the Characterization of Non-Metallic Materials for Automobiles, updated October 2011. The VOC value according to VDA-278 is a measure for the total of readily volatile to medium volatile substances, and is calculated as the toluene equivalent of the total peak area of the GC-MS chromatogram up to n-pentacosane (C25—in our case up to 49.4 min) obtained under VOC prescribed conditions (cf. below). The FOG value is the total of substances with low volatility, and is calculated as the hexadecane equivalent of the total GC-MS peak area of compounds eluting from the retention time of n-tetradecane (C14) up to n-dotriacontane (C32) (in our case 11.7 min up to 44.5 min) under FOG prescribed conditions. A separate table shows at least all substances with an emission value ≥1 μg/g.

Sample Preparation.

The foam samples are conditioned at room temperature for 7 days (RH about 50%). A piece of foam with skin was cut of about 1 cm length, with a width of a few mm, and weighing 15.0 mg±2 mg. The exact weight is recorded with an analytical balance, and is mentioned in the tables. For each sample, two pieces of foam are cut and each was put in a thermal desorption tube, which is closed immediately and analyzed as soon as possible. For the first tube, only the VOC measurement is performed, while for the second tube the FOG measurement is performed as well, immediately following the VOC analysis. The analytical parameters of the thermal desorption and GC-MS analysis, are gathered.

Calibration.

Calibration is performed by means of a calibration solution of toluene in methanol (0.5 mg/ml) for the VOC analysis, and a hexadecane solution in methanol (0.5 mg/ml) for the FOG analysis. For this purpose, 4 μl of these solutions are loaded on a conditioned Tenax tube and analyzed. These standards are analyzed in triplicate to obtain representative average values. All the results are quantified as toluene and hexadecane equivalents for the VOC and FOG analyses, respectively. A control solution consisting of 18 different compounds is analyzed regularly to check the performance of the system.

What is claimed is:

1. A polymeric polyol composition comprising the reaction product(s) of:
(i) a polyamine initiator composition which is the reaction product(s) of the polymerization of aminoethylpiperazine (AEP) comprising one or more of the compounds represented by the structures:

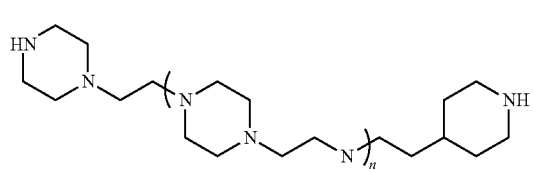

II where n is from 1 to 10;

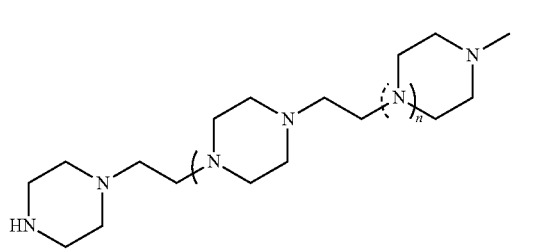

IV

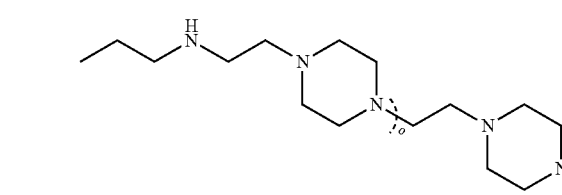

where n is from 0 to 10 and o is from 1 to 10 with the proviso that n+o is equal to or less than 10;

and

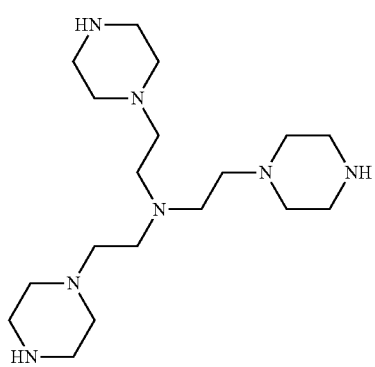

V (ii) at least one epoxide compound having the structure VI:

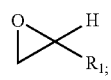

VI or at least one glycidyl ether compound having the structure VII:

VII or a combination thereof;

wherein $R^1$ is hydrogen, phenyl, cyclohexyl, or a $C_1$ to $C_{18}$ linear or branched alkyl and $R^2$ is hydrogen, phenyl, a $C_1$ to $C_6$ linear or branched alkyl-substituted phenyl, or a $C_1$-$C_{18}$ linear or branched alkyl.

2. The polymeric polyol composition of claim 1 wherein the epoxide compound is ethylene oxide, propylene oxide, or mixtures thereof.

3. The polymeric polyol composition of claim 2 comprising a polymeric polyol having the following structure:

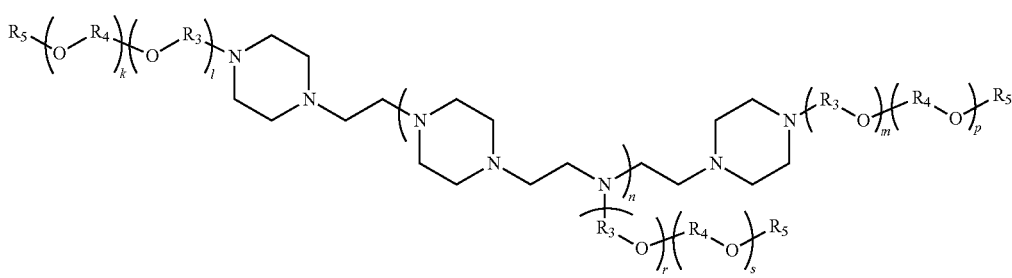

VIII where $R_3$ is ethylene; $R_4$ is propylene; $R_5$ is H, ethyl, or propyl; n is 1 to 10 and k, l, m, p, r, and s are independently 0 to 100.

4. The polymeric polyol composition of claim 3 where both k and l are equal to or greater than 1, and/or both m and p are equal to or greater than 1, and/or both r and s are equal to or greater than 1 and each copolymer structure comprising ethylene oxide and propylene oxide is blocky or random.

5. A process to make a polyurethane polymer by reaction of a mixture comprising:

(A) a polymeric polyol formulation comprising the polymeric polyol composition of claim 1;

(B) at least one organic isocyanate;

(C) optionally a blowing agent; and (D) optionally additives or auxiliary agents for the production of polyurethane polymers.

6. The process of claim 5 wherein the reaction occurs in the presence of a blowing agent and the polyurethane polymer is produced in the form of a polyurethane foam.

* * * * *